(12) United States Patent
Durham

(10) Patent No.: US 10,100,909 B2
(45) Date of Patent: Oct. 16, 2018

(54) TORQUE TRANSMISSION DEVICE FOR MOTOR VEHICLE

(71) Applicant: VALEO EMBRAYAGES, Amines (FR)

(72) Inventor: Patrick Durham, Troy, MI (US)

(73) Assignee: Valeo Embrayages, Amiens (FR)

( * ) Notice: Subject to any disclaimer, the term of this patent is extended or adjusted under 35 U.S.C. 154(b) by 0 days.

(21) Appl. No.: 15/188,408

(22) Filed: Jun. 21, 2016

(65) Prior Publication Data

US 2017/0363195 A1   Dec. 21, 2017

(51) Int. Cl.
| | |
|---|---|
| *F16H 45/02* | (2006.01) |
| *F16F 15/121* | (2006.01) |
| *F16D 25/06* | (2006.01) |
| *F16F 15/133* | (2006.01) |

(52) U.S. Cl.
CPC .............. *F16H 45/02* (2013.01); *F16D 25/06* (2013.01); *F16F 15/1215* (2013.01); *F16F 15/1333* (2013.01); *F16F 15/1336* (2013.01); *F16F 2230/0064* (2013.01); *F16H 2045/0205* (2013.01); *F16H 2045/0221* (2013.01); *F16H 2045/0278* (2013.01)

(58) Field of Classification Search
CPC .............. F16H 2045/0221; F16H 45/02; F16F 15/1215; F16F 2230/0064; F16D 25/06
See application file for complete search history.

(56) References Cited

U.S. PATENT DOCUMENTS

| | | | |
|---|---|---|---|
| 2,551,718 A | 5/1951 | Auten | |
| 4,145,936 A | 3/1979 | Vincent et al. | |
| 5,070,974 A * | 12/1991 | Kirkwood | ........... F16F 15/1215 192/208 |
| 5,697,261 A | 12/1997 | Mokdad et al. | |
| 5,893,355 A | 4/1999 | Glover et al. | |
| 2001/0032767 A1 * | 10/2001 | Reinhart | ................... F16F 1/34 192/3.29 |
| 2003/0106763 A1 | 6/2003 | Kimura et al. | |
| 2015/0369296 A1 * | 12/2015 | Lopez-Perez | ......... F16F 15/121 464/77 |
| 2017/0234400 A1 | 8/2017 | Fenioux et al. | |

FOREIGN PATENT DOCUMENTS

| | | |
|---|---|---|
| DE | 19729421 A1 | 1/1998 |
| DE | 19919449 A1 | 11/1999 |
| DE | 102004024747 A1 | 12/2005 |

(Continued)

*Primary Examiner* — Ramya P Burgess
*Assistant Examiner* — Lillian T Nguyen
(74) *Attorney, Agent, or Firm* — Berenato & White, LLC

(57) ABSTRACT

A torque transmission device, particularly for a motor vehicle, comprises a torque input element (15, 17) and a torque output element (8) configured to pivot about an axis (X) with respect to one another, at least one elastic leaf (22), rotationally coupled to the torque output element (8) or to the torque input element (15, 17) respectively. The at least one elastic leaf (22) is configured to elastically and radially engage a supporting member (18) carried by the torque input element (15, 17) or the torque output element (8) respectively. The at least one elastic leaf (22) is configured to bend upon rotation of the torque input element (15, 17) with respect to the torque input element (8).

19 Claims, 7 Drawing Sheets

(56) References Cited

FOREIGN PATENT DOCUMENTS

| | | |
|---|---:|---|
| EP | 1048420 A2 | 11/2000 |
| EP | 2824361 A1 | 1/2015 |
| FR | 2339107 A1 | 8/1977 |
| FR | 2493446 A1 | 5/1982 |
| FR | 2499182 A1 | 8/1982 |
| FR | 2628804 A1 | 9/1989 |
| FR | 2714435 A1 | 6/1995 |
| FR | 2828543 A1 | 2/2003 |
| FR | 2938030 A1 | 5/2010 |
| FR | 3000155 A1 | 6/2014 |
| FR | 3008152 | 1/2015 |
| GB | 1212042 A | 11/1970 |
| GB | 2235749 A | 3/1991 |
| GB | 2262795 A | 6/1993 |
| GB | 2283558 A | 5/1995 |
| GB | 2284875 A | 6/1995 |
| GB | 2468030 A | 8/2010 |
| JP | 09280317 A | 10/1997 |
| WO | WO9914114 A1 | 3/1999 |
| WO | WO2004016968 A1 | 2/2004 |
| WO | WO2011006264 A1 | 1/2011 |
| WO | WO2014128380 A1 | 8/2014 |
| WO | WO2016050612 A1 | 4/2016 |

\* cited by examiner

TORQUE TRANSMISSION DEVICE FOR MOTOR VEHICLE

FIELD OF THE INVENTION

The present invention relates to a torque transmitting device and a hydrokinetic torque coupling device for a motor vehicle, such as a torque converter, for instance.

BACKGROUND OF THE INVENTION

A known hydrodynamic torque converter is schematically and partially illustrated in FIG. 1 and makes it possible to transmit a torque from the output shaft of an internal combustion engine in a motor vehicle, such as for instance a crankshaft 1, to a transmission input shaft 2.

The torque converter conventionally comprises an impeller wheel 3, able to hydrokinetically drive a turbine wheel 4 through a reactor 5.

The impeller wheel 3 is coupled to the crankshaft 1 and the turbine wheel 4 is coupled to guiding washers 6.

A first group of elastic members 7a, 7b of the compression spring type is mounted between the guiding washers 6 and a central hub 8 is coupled to the transmission input shaft 2. The elastic members 7a, 7b of the first group are arranged in series through a phasing member 9, so that the elastic members 7a, 7b are deformed in phase with each other, with the phasing member 9 being movable relative to the guiding washers 6 and relative to the hub 8.

A second group of elastic members 7c is mounted with some clearance between the guiding washers 6 and the central hub 8 in parallel with the first group of elastic members 7a, 7b, with the elastic members 7c being adapted to be active on a limited angular range, more particularly at the end of the angular travel of the guiding washers 6 relative to the central hub 8. The angular travel, or the angular shift noted $\alpha$, of the guiding washers 6 relative to the hub 8, is defined relative to a rest position ($\alpha=0$) wherein no torque is transmitted through the damping assembly formed by the above-mentioned elastic members 7a, 7b.

The torque converter further comprises clutch means 42 making it possible to transmit a torque from the crankshaft 1 to the guiding washers 6 in a determined operation phase, without any action from the impeller wheel 3 and the turbine wheel 4.

The second group of elastic members 7c makes it possible to increase the stiffness of the damping assembly at the end of the angular travel, i.e. for a significant $\alpha$ angular offset of the guiding washers 6 relative to the hub 8 (or vice versa).

It can be seen that the representation of function $M=f(\alpha)$ which defines the M torque transmitted though the device according to the $\alpha$ angular shift, comprises a first linear portion of slope Ka (for the low values of the $\alpha$ angular shift) and a second, more important, linear portion of slope Kb (for the high value of the $\alpha$ angular shift). Ka and Kb are the angular stiffness of the device, at the beginning and at the end of the angular travel respectively. If K1 defines the cumulated stiffness of the first springs of each pair of the first group, and K2 defines the cumulated stiffness of the second springs of each pair of the first group, and K3 defines the cumulated stiffness of the springs of the second group, then $Ka=(K1 \cdot K2)/(K1+K2)$ and $Kb=Ka+K3$.

The break of slope between the first and second portions of the curve may generate vibrations and a significant hysteresis upon operation of the torque converter which might affect the quality of filtration obtained using the damping assembly.

Using a damping assembly using elastic members instead of springs, for other applications, and specifically in a dual flywheel, is known. Using elastic leaves makes it possible to obtain a gradual characteristic curve, with no break of slope, so as to improve the filtration quality.

Document FR 3 008 152 can be mentioned, which discloses a dual flywheel comprising a primary flywheel intended to be rotationally coupled to a crankshaft, forming a torque input element and bearing supporting members, a secondary flywheel rotationally mobile relative to the primary flywheel, forming a torque output element and bearing elastic leaves, with the leaves being elastically held and radially resting on the supporting members so as to bend upon rotation of the primary flywheel relative to the secondary flywheel.

Each leaf more particularly comprises a radially internal strand attached to the secondary wheel and a radially external strand resting against the matching supporting member, with the strands being connected together through a curved or bent area.

Such damping assemblies only allow a limited angular displacement of the primary wheel relative to the secondary wheel. As a matter of fact, the structure of the leaves requires to limit the displacement so as to limit the mechanical stress in the leaves to an admissible value.

A need exists to increase the angular displacement between the torque input element and the torque output element so as to still improve the filtration quality, while generating acceptable mechanical stress in operation.

SUMMARY OF THE INVENTION

The invention more particularly aims at providing a simple, efficient and cost-effective solution to this problem.

For this purpose, it provides for a torque transmitting device, specifically for a motor vehicle, comprising a torque input element and a torque output element able to pivot about an axis with respect to one another, at least one elastic leaf, rotationally coupled to the torque output element or to the torque input element respectively, with the elastic leaf being able to be elastically and radially held by a supporting member carried by the torque input element or the torque output element respectively, with the elastic leaf being able to bend upon rotation of the torque input element with respect to the torque output element.

The elastic leaf comprises a radially external strand comprising a radially external surface forming a raceway supported by the rolling body, a radially internal strand rotationally coupled with the torque output element or torque input element respectively, a radially median strand radially located between the radially internal and external strands, with the median strand comprising a first circumferential end connected with the internal strand by a first curved or bent area, with the median strand comprising a second circumferential end connected with the external strand by a second curved or bent area.

Such a structure of the leaf makes it possible to reduce the constraints within the leaf, and thus enables a larger displacement of the torque input element with respect to the torque output element, as compared to the prior art, for the same level of allowable constraints.

The median strand and/or the first curved or bent area may comprise at least one area having a smaller section than the external strand and/or than the second curved or bent area.

Such a characteristic enables a better distribution of mechanical stresses within the leaf.

More particularly, the thickness, i.e. the axial dimension, of the elastic leaf, is substantially constant, with the variation in section being obtained by varying the width, i.e. by varying the radial dimension of the leaf section.

The raceway along which the rolling body is able to roll in operation comprises a bearing area at rest forming the bearing area of the rolling body in the position of rest of the device, i.e. when no torque is transmitted through the device, with a forward or drive bearing area forming the bearing area of the rolling body when the torque input element pivots with respect to the torque output element in a first so-called forward or drive direction of rotation, with the drive bearing area being located opposite the second curved or bent portion with respect to the bearing area at rest, and a backward or coast bearing area forming the bearing area of the rolling body when the torque input element pivots with respect to the torque output element in a second so-called backward or coast direction of rotation, with the coast bearing area being located on the second curved or bent portion side with respect to the bearing area at rest, with the drive bearing area angularly extending over a range from 10 to 100°, for example of the order of 90°, with the coast bearing area angularly extending over a range from 10 to 30°, for example of the order of 25°.

The external strand may angularly extend over a range from 80 to 180°, for example of the order of 150°.

The raceway thus angularly extends over only a portion of the external strand, preferably over the portion of the strand positioned opposite the second curved area, so as to limit mechanical stresses.

The median strand may angularly extend over a range from 80 to 165°, for example of the order of 130°.

The median strand may comprise a portion substantially extending along an arc of circle.

More particularly, the semi-circular portion of the median strand may be substantially concentric with the internal strand, in order to lower the stress.

The drive bearing area comprises a straight or concave portion, located close to the bearing area at rest, with the rest of the raceway being domed or convex.

The supporting member may comprise a rolling body so mounted as to pivot about a shaft, with said shaft being attached to the torque input element, respectively the torque output element.

In such case, the rolling body of the supporting member may consist of a roller so mounted as to pivot about a shaft, for instance through a rolling bearing, such as a needle bearing, for instance.

The elastic leaf may be so designed that, in a relative angular position between the torque input element and the torque output element different from a rest position, the supporting member exerts a bending stress on the elastic leaf causing a cross reaction force of the elastic leaf on the supporting member, with such reaction force having a circumferential component which tends to move back the torque input element and the torque output element toward said relative rest position.

The elastic leaf may be so designed that, in a relative angular position between the torque input element and the torque output element different from a rest position, the supporting member exerts a bending stress on the elastic leaf causing a cross reaction force of the elastic leaf on the supporting member, with such reaction force having a radial component which tends to hold the elastic leaf in contact with the supporting member.

The damping assembly may comprise at least two elastic leaves, with each elastic leaf rotating together with the torque output element, or the torque input element respectively, with each leaf being associated with a supporting element rotationally linked with the torque input element, or the torque output element respectively, with each leaf being elastically maintained supported by said matching supporting element, with each elastic leaf being adapted to bend upon rotation of the torque input element relative to the torque output element.

Both leaves may then have the same structure and be mutually symmetrical, with the axis of symmetry being the axis of rotation of the torque input element relative to the torque output element.

Both leaves may be integral, with the radially internal strands of the leaves being formed in the same annular portion.

The invention also provides for a hydrokinetic torque coupling device for a motor vehicle, comprising:
 a cover intended to be rotationally coupled to a crankshaft,
 an impeller wheel rotationally coupled to the cover,
 a turbine wheel able to be hydrokinetically driven into rotation by the impeller wheel,
 a hub coupled to the turbine wheel and able to be rotationally coupled to a transmission input shaft,
 a clutch movable from an engaged position in which the cover and the hub are coupled together through a torque transmission device of the above-mentioned type, with the torque input element of the device being connected to or consisting of the clutch, with the torque output element being connected to or consisting of the hub, and a disengaged position in which the cover and the hub are coupled together through the hydrokinetic coupling assembly consisting of the impeller wheel and the turbine wheel.

The clutch may comprise a piston able to rest on a portion of the cover in the engaged position, so as to provide a rotational coupling of the cover and the piston, and able to be spaced from the cover in the disengaged position, so as to rotationally uncouple the cover and the piston.

The supporting members may be mounted onto the annular flange rotationally coupled to the piston.

It should be noted that a hydrokinetic torque coupling device may be a torque converter when the hydrokinetic torque coupling assembly comprises an impeller wheel, a turbine wheel and a reactor, or may be a coupler when the hydrokinetic torque coupling assembly has no reactor.

The cover may, at least partially, accommodate the impeller wheel, the turbine wheel and/or the torque transmitting device.

BRIEF DESCRIPTION OF THE DRAWINGS

The invention will be better understood, and other details, characteristics and advantages of the invention will appear upon reading the following description given by way of a non restrictive example while referring to the appended drawings wherein.

DETAILED DESCRIPTION OF THE PREFERRED EMBODIMENT(S)

Figure 1:
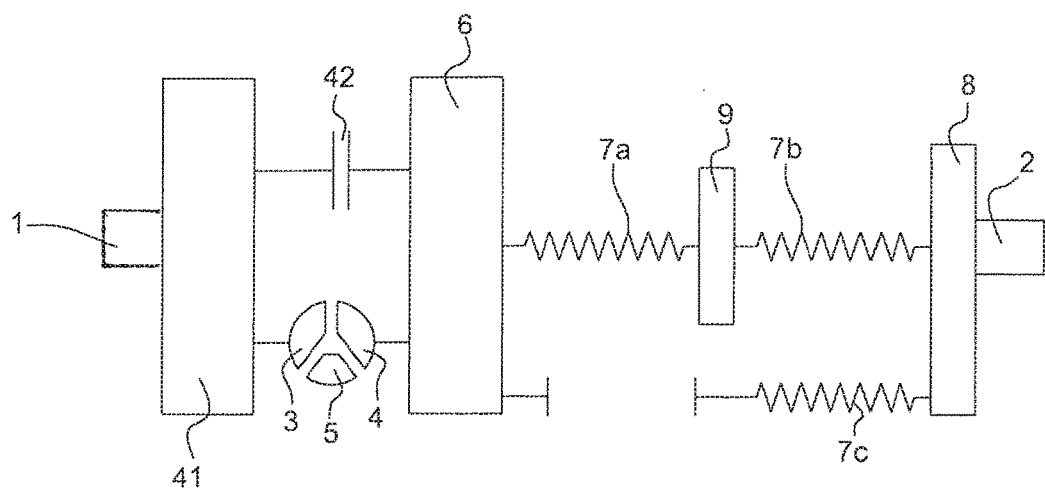
FIG. 1 is a schematic representation of a torque converter of the prior art.
Figure 2:
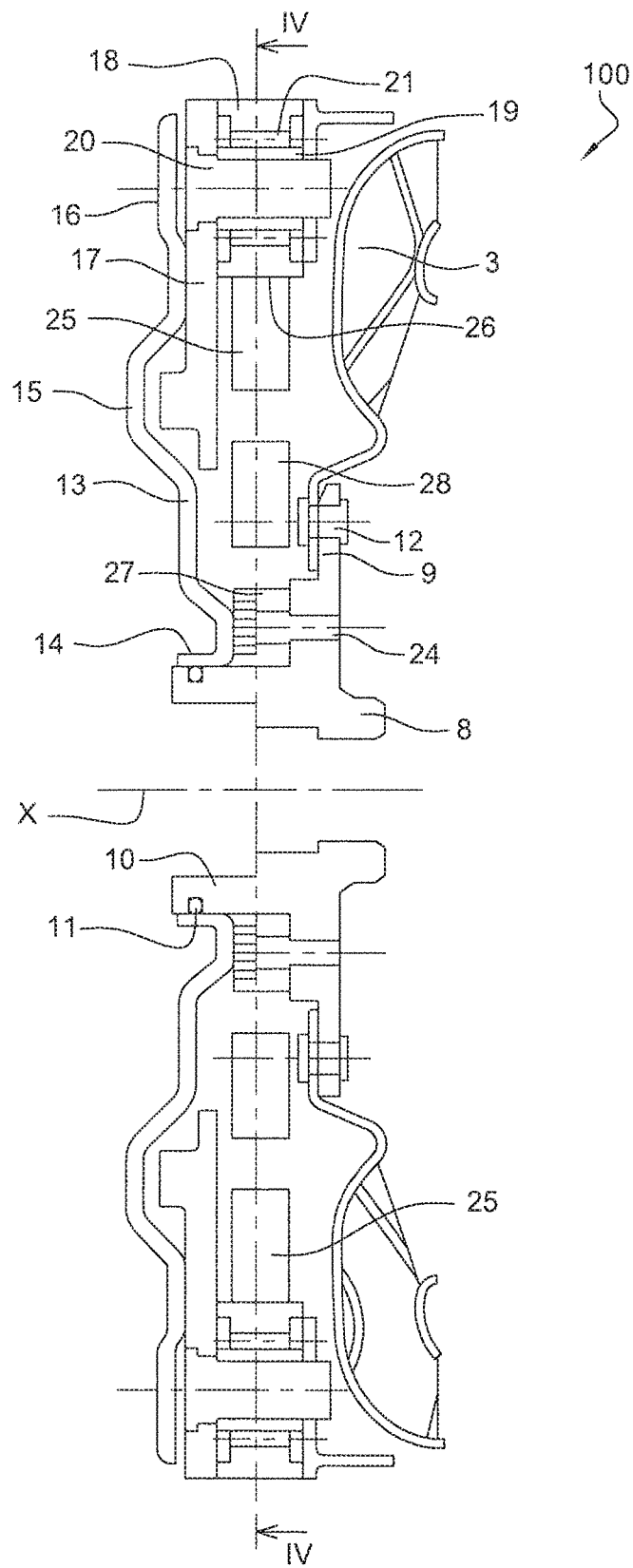
FIG. 2 is a sectional view of a part of a hydrokinetic torque coupling device according to one embodiment of the invention.
Figure 3:
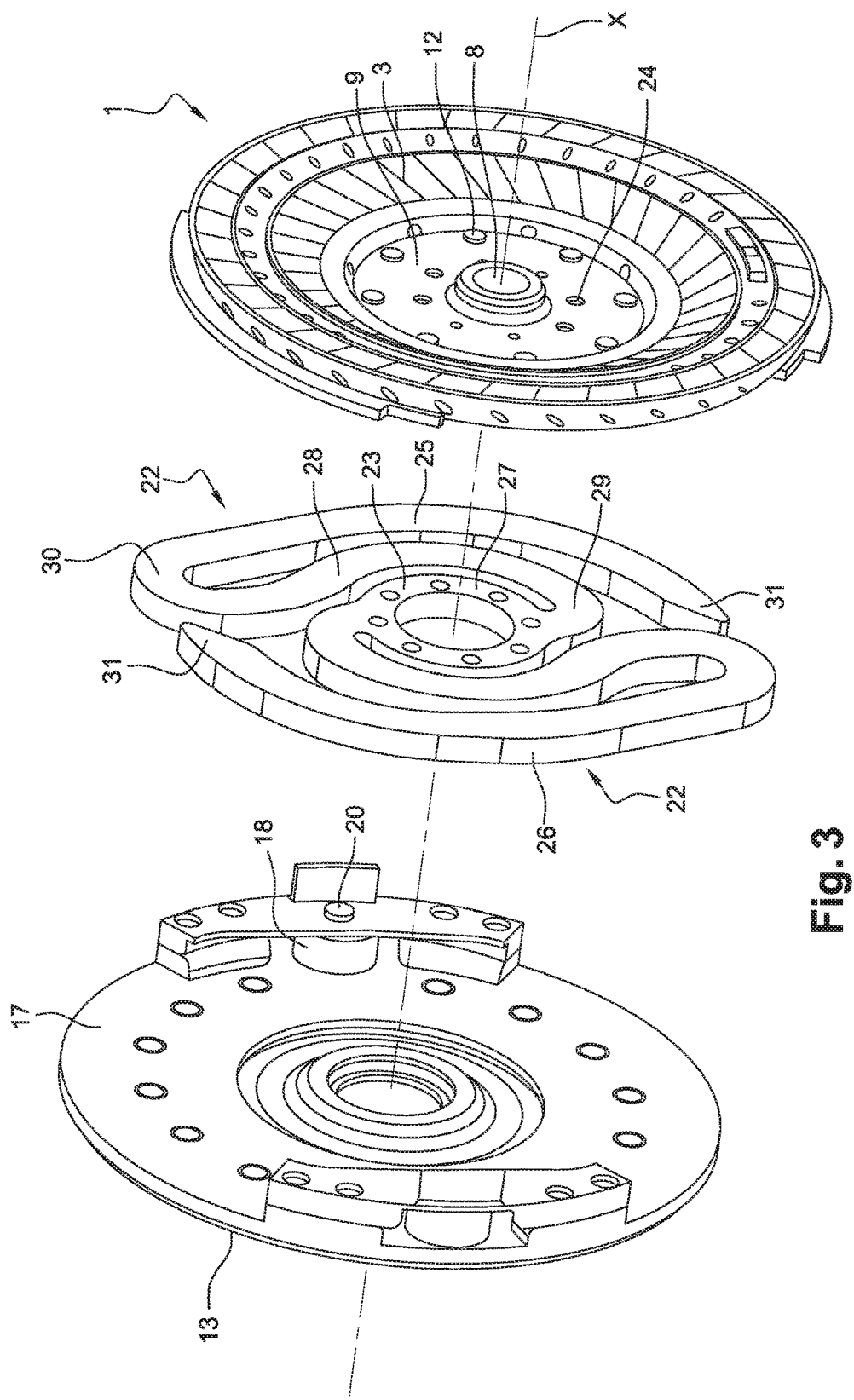
FIG. 3 is an exploded perspective view of a part of the hydrokinetic torque coupling device.

FIGS. 2 to 6 illustrate a hydrokinetic torque coupling device 100 for a motor vehicle, according to one embodiment of the invention. The hydrokinetic torque coupling device 100 is more particularly a hydrodynamic torque converter. Such device makes it possible to transmit a torque from the output shaft of an internal combustion engine in a motor vehicle, such as for instance a crankshaft 1, to a transmission input shaft 2. The axis of the torque converter bears reference X.

In the following, the words "axial", "radial" and "circumferential" are defined relative to the X axis.

The torque converter conventionally comprises an impeller bladed wheel 3, able to hydrokinetically drive a turbine bladed wheel 4 through a reactor 5.

The impeller wheel 3 is attached to a cover 41, which defines an internal volume accommodating the impeller wheel 3, the turbine wheel 4 and the reactor 5. The cover comprises attaching means making it possible to rotationally couple the cover to the crankshaft 1.

The torque converter further comprises a central hub 8, the radially internal periphery of which is ribbed, with an X axis and accommodated in the internal volume of the cover. The central hub 8 comprises an annular rim 9 which radially extends outwards, and a cylindrical part 10 wherein an annular groove is formed and used for mounting an O-ring 11.

The turbine wheel 4 is fastened to the annular rim 9 of the central hub 8, for instance by rivets 12 or by welding.

The torque converter further comprises a piston 13 comprising a radially internal cylindrical part 14, mounted around the cylindrical part 10 of the hub 8, around the O-ring, from which a radial part 15 extends. The radially external periphery of the radial part 15 of the piston 13 comprises a clutch lining 16, intended to rest onto a radial surface of the cover.

The piston 13 is rotationally coupled to a radially extending annular flange 17. The piston 13 and the flange 17 are mounted so as to pivot about the hub 8.

Two supporting members or rolling bodies 18 shaped as rollers or cylindrical rollers, are fastened on the radially external periphery of the flange 17. The rolling bodies 18 are positioned so as to be diametrically opposed. The rolling bodies 18 are more specifically mounted about axially extending shafts 19, with said shafts 19 being mounted on the flange using rivets 20, screws or bolts, for instance. The rolling bodies 18 are mounted on the shafts 19 through rolling bearings 21, such as needle bearings, for instance.

The torque converter further comprises two diametrally opposed elastic leaves 22, formed here in one piece and assembled together with an annular central part 23 fixed to the hub 8 by screws 24 for instance. The two leaves 22 may, of course, consist of two separate parts.

In any case, the elastic leaves 22 are preferably regularly distributed around the X axis and are symmetrical relative to the X axis so as to ensure the balance of the torque converter.

Figure 4:
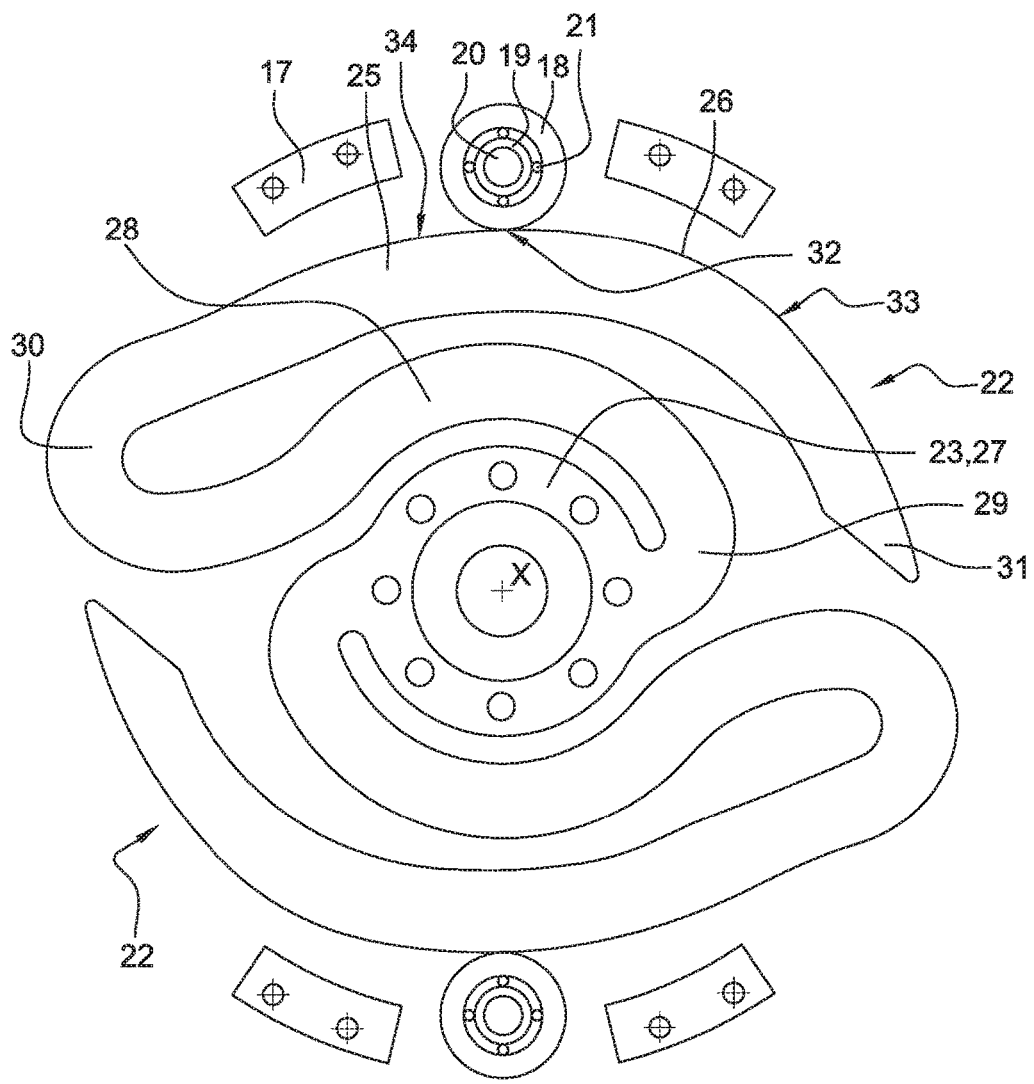
FIG. 4 is a sectional view along the IV-IV plane in FIG. 2.

Each leaf 22 comprises a radially external strand 25 comprising a radially external surface 26, a radially internal strand 27 formed by a portion of the annular central part 23, and a radially median strand 28 positioned radially between the radially internal 27 and external 25 strands so that the median strand 28 is disposed radially under the external strand 25 and radially above the internal strand 27, as best shown in FIG. 4. The median strand 28 comprises a first circumferential end adjacent to a free distal end 31 of the external strand 25 and linked to the internal strand 27 through a first curved or bent area 29. The median strand 28 also comprises a second circumferential end linked to the external strand 25 through a second curved or bent area 30.

Each external strand 25 develops on the circumference with an angle ranging from 120° to 180°. The radially external surface 26 of each external strand 25 forms a raceway engaging the corresponding rolling body 18, with the rolling body 18 being positioned radially outside the external strand 25. Each raceway 26 has a globally convex shape. The raceway 26 may include a zone of the external strand 25 or a part which is added onto the external strand 25.

Each median strand 28 develops on the circumference with an angle ranging from 80° to 165°.

The external 25 and median 28 strands, as well as the curved or bent areas 29, 30 are elastically deformable in the radial direction. Each curved area 29, 30 forms an angle of about 180°.

The raceways 26 have profiles so arranged that, when the transmitted torque increases, the rolling bodies 18 each exert a bending stress on the matching elastic leaf 22, which causes the free distal end 31 of the elastic leaves 22 to move towards the X axis and a relative rotation between the cover and the hub 8 such that the later move away from their relative rest positions illustrated in FIG. 4. Rest position means the relative position of the cover with respect to the hub 8, in which no torque is transmitted between the latter.

The profiles of the raceways 26 are thus such that the rolling bodies 18 exert bending stresses having radial components and circumferential components onto the elastic leaves 22.

The elastic leaves 22 exert, onto the rolling bodies 18, a back moving force having a circumferential component which tends to rotate the rolling bodies 18 in a reverse direction of rotation and thus to move back the turbine wheel 4 and the hub 8 towards their relative rest positions, and a radial component directed outwards which tends to maintain the raceways 26 supported by the matching rolling body 18.

When the cover and the hub 8 are in their rest position, each elastic leaf 22 is preferably radially pre-stressed toward the X axis so as to exert a reaction force directed radially outwards, so as to maintain each leaf 22 supported by the matching rolling body 18.

The profiles of the raceways 26 may equally be so arranged that the characteristic transmission curve of the torque according to the angular displacement α is symmetrical or not relative to the rest position. According to one embodiment shown here in the figures, the angular displacement α may be more important in a so-called forward or drive direction of rotation than in an opposite, so-called backward or coast direction of rotation.

The torque converter may also comprise friction element so arranged as to exert a resisting torque between the cover and the hub 8 during the relative displacement thereof so as to dissipate the energy stored in the elastic leaves.

The raceway 26 of each leaf 22 comprises a bearing area at rest 32 forming the bearing area of the rolling body 18 in the position of rest of the torque converter, with a forward or drive bearing area 33 forming the bearing area of the rolling body 18 when the cover pivots with respect to the hub 8 in a forward direction of rotation, with said drive bearing area 33 being located opposite the second curved or bent portion 30 with respect to the bearing area at rest 32, and a backward or coast bearing area 34 forming the bearing area of the rolling body 18 when the cover pivots with respect to the hub 8 in a second so-called backward or coast direction of rotation, with said backward bearing area 34 being located on the second curved or bent portion 30 side with respect to the bearing area at rest 32.

The drive bearing area 33 angularly extends over a range from 10 to 100° for example of the order of 90°, from the area 32. The coast bearing area 34 angularly extends over a range from 10 to 30° for example of the order of 25°, from the area 32.

Figure 5:
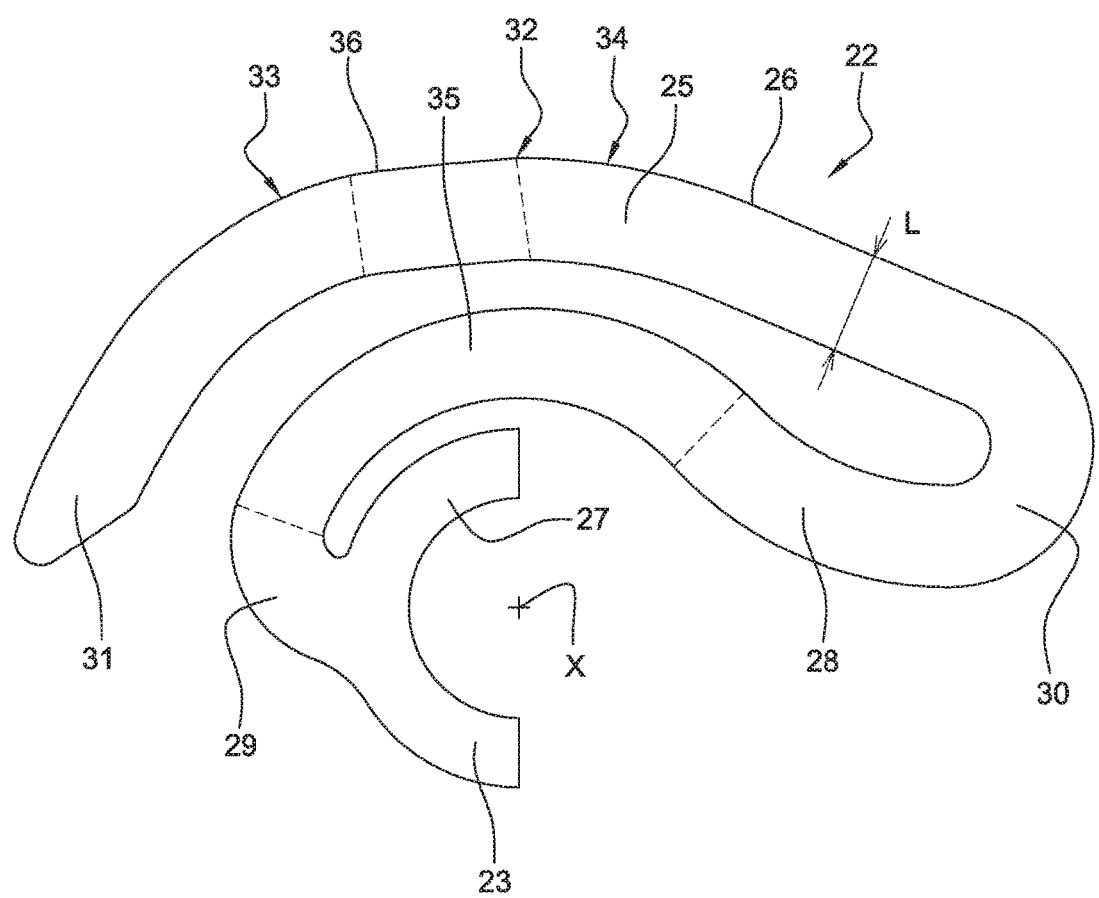
FIG. 5 is a half-view, from the front, showing a leaf which is provided on the hydrokinetic torque coupling device.
Figure 6:
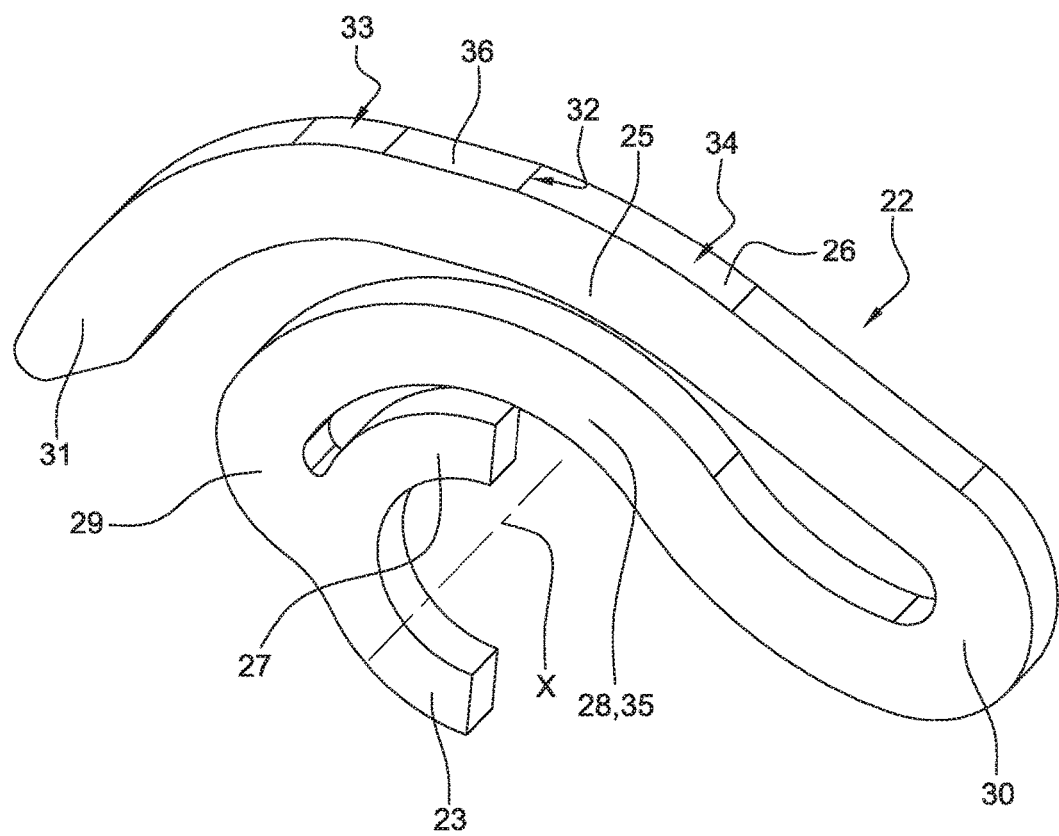
FIG. 6 is a half-view, in perspective, showing said leaf.

The median strand 28 comprises a portion 35 which substantially extends along an arc of circle (defined by the dotted lines in FIG. 5). More particularly, the semi-circular portion 35 of the median strand 28 is substantially concentric with the semi-circular trajectory of the point of contact between the supporting member 18 and the raceway 26 of the external strand 25.

The median strand 28 and/or the first curved or bent area 29 comprise at least an area having a smaller section than the external strand 25 and/or than the second curved or bent area 30.

More particularly, the thickness, i.e. the axial dimension, of the elastic leaf 22, is substantially constant, with the variation in section being obtained by varying the width L (FIG. 5), i.e. by varying the radial dimension of the leaf 22 section.

The forward bearing area 33 comprises a straight or flat or still concave portion 36 (defined by dotted lines in FIG. 5), located close to, or extending from the bearing area at rest 32, with the rest of the raceway 26 being domed or convex.

Figure 7:
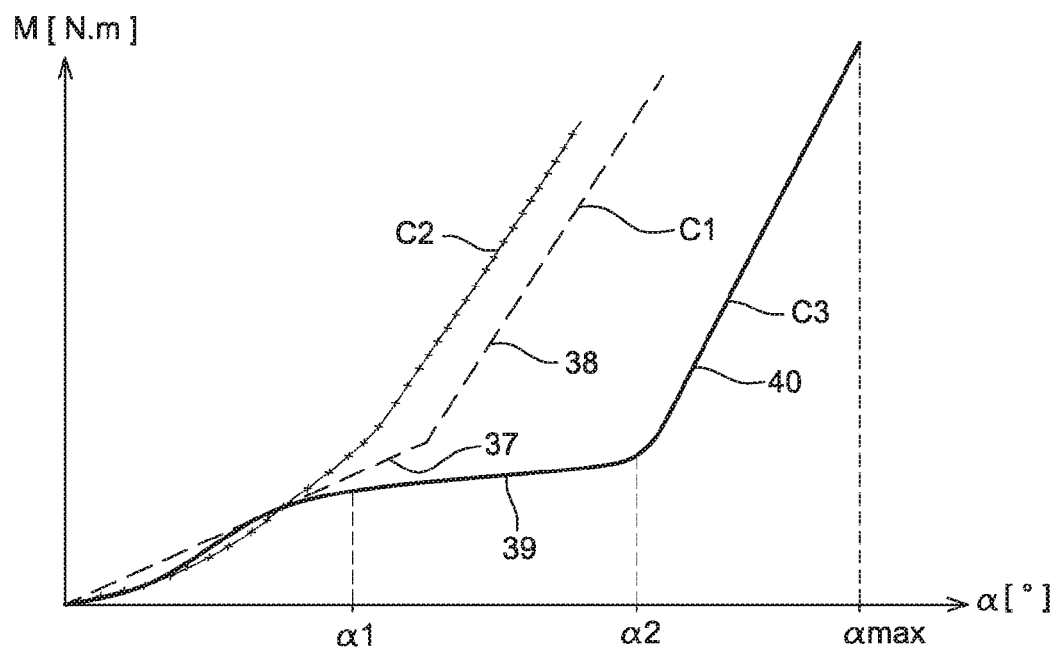
FIG. 7 is a diagram showing the characteristic curves of the hydrokinetic torque coupling device according to the invention and according to the prior art.

FIG. 7 shows the characteristic curve of a torque transmitting device, i.e. the evolution of the torque M transmitted through the device, according to the angular shift or displacement α of the torque input element, as compared to the torque output element, in the forward direction, respectively:

for a torque transmitting device of the prior art according to the one shown in FIG. 1 and provided with two spring stages (curve C1), for a torque transmitting device similar to the one disclosed in the document FR 3 008 152 wherein each leaf only comprises an external strand forming the raceway and an internal strand (curve C2), for a torque transmitting device according to the invention, provided with a leaf comprising an external strand, a median strand, and an internal strand (curve C2), The α=0 position defines the rest position of the device.

It may be noted that the curve C1 comprises a first linear portion 37 having a slope Ka (for the low values of the angular displacement C) and a second linear portion 38 having a higher slope Kb (for the high values of the angular shift α). Ka and Kb are the angular stiffness of the device, at the beginning and at the end of the angular travel respectively. As mentioned above, the break of slope between the first and second portions 36, 37 of the curve C1 may generate vibrations and a significant hysteresis upon operation of the torque converter which might affect the quality of filtration obtained using the damping means.

It may also be noted that the curve C2 is more gradual and shows no break of slope, with the torque quickly increasing, however, with the angular displacement α, which may affect the quality of the filtration obtained.

It may eventually be noted that the curve C3 comprises an area 39 having a low, or even no, slope, with the torque increasing again with the angular displacement α in the area bearing reference number 40. Such area 39 could be used in cylinder deactivation applications, for example.

Such area extends from a displacement α1 ranging from 10 to 45°, for example of the order of 30°, and a displacement α2 ranging from 30 to 65°, for example of the order of 50°.

Figure 8:
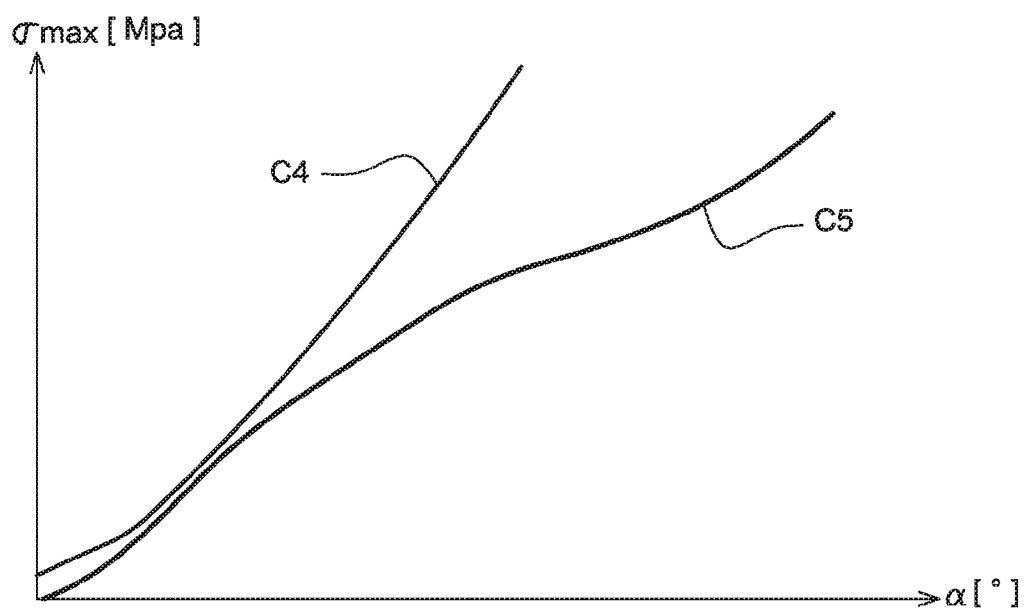
FIG. 8 is a diagram showing the variation in the mechanical stresses exerted in the leaf according to the displacement of the torque input element relative to the torque output element, within an elastic leaf according to the invention and within an elastic leaf according to the prior art.

FIG. 8 shows the evolution of maximum mechanical stresses σmax, typically tension stress, within each leaf 22, in the case of a device of the prior art, according to the one disclosed in document FR 3 008 152 (curve C4), and in the case of a device according to the invention (curve C5).

It may be noted that the leaves 22 of the device according to the invention are subject to smaller stresses than in the case of the prior art, for the same angular displacement α, which makes it possible to increase the total displacement of the device while remaining within the limit of permissible constraints.

The filtration quality is thus substantially increased as compared to the devices of the prior art.

The invention claimed is:

1. A torque transmission device, comprising:
    a torque input element (15, 17) and a torque output element (8) pivotable about an axis (X) with respect to one another;
    at least one elastic leaf (22) rotationally coupled to one of the torque output element (8) and the torque input element (15, 17); and
    a supporting member (18) carried by another one of the torque output element (8) and the torque input element (15, 17), the at least one elastic leaf (22) configured to elastically and radially engage the supporting member (18);
    the at least one elastic leaf (22) configured to bend upon rotation of the torque input element (15, 17) with respect to the torque input element (8);
    the at least one elastic leaf (22) comprising a radially external strand (25) comprising a radially external surface forming a raceway (26) in contact with the supporting member (18), a radially internal strand (27) rotationally coupled with one of the torque output element (8) and torque input element (15, 17), and a radially median strand (28) located radially between the radially internal (27) and external (25) strands so that the median strand is disposed radially under the external strand;
    the median strand (28) comprising a first circumferential end connected with the internal strand (27) by a first curved area (29);
    the median strand (28) further comprising a second circumferential end connected with the external strand (25) by a second curved area (30);
    the external strand (25) and the median strand (28) being elastically deformable in the radial direction;
    the supporting member (18) configured to move along the raceway (26).

2. The device according to claim 1, wherein at least one of the median strand (28) and the first curved area (29) comprises an area having a smaller section than at least one of the external strand (25) and the second curved area (30).

3. The device according to claim 2, wherein the external strand (25) angularly extends over a range from 80 to 180°.

4. The device according to claim 2, wherein the raceway (26) comprises a bearing area at rest (32), a forward bearing area (33) and a backward bearing area (34), wherein the bearing area at rest (32) forms the bearing area of the supporting member (18) in a position of rest of the device (1) when no torque is transmitted through the device (1), wherein the forward bearing area (33) forms the bearing area of the supporting member (18) when the torque input element (15, 17) pivots with respect to the torque output element (8) in a first direction of rotation, wherein the forward bearing area (33) is located opposite the second curved area (30) with respect to the bearing area at rest (32), wherein the backward bearing area (34) forms the bearing area of the supporting member (18) when the torque input element (15, 17) pivots with respect to the torque output element (8) in a second direction of rotation, wherein the backward bearing area (34) is located on the second curved area (30) side with respect to the bearing area at rest (32), wherein the forward bearing area (33) angularly extends over a range from 10 to 100°, and wherein the backward bearing area (34) angularly extends over a range from 10 to 30°.

5. The device according to claim 2, wherein the median strand (28) angularly extends over a range from 80 to 165°.

6. The device according to claim 1, wherein a thickness of the at least one elastic leaf (22) in an axial direction is substantially constant, and wherein a section of the at least one elastic leaf (22) varies by varying a width (L) in the radial direction of the at least one elastic leaf (22).

7. The device according to claim 6, wherein the raceway (26) comprises a bearing area at rest (32), a forward bearing area (33) and a backward bearing area (34), wherein the bearing area at rest (32) forms the bearing area of the supporting member (18) in a position of rest of the device (1) when no torque is transmitted through the device (1), wherein the forward bearing area (33) forms the bearing area of the supporting member (18) when the torque input element (15, 17) pivots with respect to the torque output element (8) in a first direction of rotation, wherein the forward bearing area (33) is located opposite the second curved area (30) with respect to the bearing area at rest (32), wherein the backward bearing area (34) forms the bearing area of the supporting member (18) when the torque input element (15, 17) pivots with respect to the torque output element (8) in a second direction of rotation, wherein the backward bearing area (34) is located on the second curved area (30) side with respect to the bearing area at rest (32), wherein the forward bearing area (33) angularly extends over a range from 10 to 100°, and wherein the backward bearing area (34) angularly extends over a range from 10 to 30°.

8. The device according to claim 6, wherein the external strand (25) angularly extends over a range from 80 to 180°.

9. The device according to claim 6, wherein the median strand (28) angularly extends over a range from 80 to 165°.

10. The device according to claim 1, wherein the raceway (26) comprises a bearing area at rest (32), a forward bearing area (33) and a backward bearing area (34), wherein the bearing area at rest (32) forms the bearing area of the supporting member (18) in a position of rest of the device (1) when no torque is transmitted through the device (1), wherein the forward bearing area (33) forms the bearing area of the supporting member (18) when the torque input element (15, 17) pivots with respect to the torque output element (8) in a first direction of rotation, wherein the forward bearing area (33) is located opposite the second curved area (30) with respect to the bearing area at rest (32), wherein the backward bearing area (34) forms the bearing area of the supporting member (18) when the torque input element (15, 17) pivots with respect to the torque output element (8) in a second direction of rotation, wherein the backward bearing area (34) is located on the second curved area (30) side with respect to the bearing area at rest (32), wherein the forward bearing area (33) angularly extends over a range from 10 to 100°, and wherein the backward bearing area (34) angularly extends over a range from 10 to 30°.

11. The device according to claim 10, wherein the forward bearing area (33) comprises a straight or concave portion (36), located close to the bearing area at rest (32), with the rest of the raceway (26) being domed or convex.

12. The device according to claim 10, wherein the external strand (25) angularly extends over a range from 80 to 180°.

13. The device according to claim 10, wherein the median strand (28) angularly extends over a range from 80 to 165°.

14. The device according to claim 1, wherein the external strand (25) angularly extends over a range from 80 to 180°.

15. The device according to claim 14, wherein the median strand (28) angularly extends over a range from 80 to 165°.

16. The device according to claim 1, wherein the median strand (28) angularly extends over a range from 80 to 165°.

17. The device according to claim 1, wherein the median strand (28) comprises a portion (35) substantially extending along an arc of circle.

18. The device according to claim 17, wherein the portion (35) of the median strand (28) is substantially concentric with a semi-circular trajectory of a point of contact between the supporting member (18) and the raceway (26) of the external strand (25).

19. A hydrokinetic torque coupling device for a motor vehicle, comprising:
a cover intended to be rotationally coupled to a crankshaft (1);
an impeller wheel (3) rotationally coupled to the cover;
a turbine wheel (4) able to be hydrokinetically driven into rotation by the impeller wheel (3);
a hub (8) coupled to the turbine wheel (4), and configured to be rotationally coupled to a transmission input shaft (2); and
a clutch movable between an engaged position and a disengaged position;
wherein in the engaged position the cover and the hub (8) are coupled together through the torque transmission device according to claim 1,
wherein the torque input element of the torque transmission device is connected to the clutch (10, 15, 17),
wherein the torque output element is connected to the hub (8), and
wherein in the disengaged position the cover and the hub (8) are coupled together through the impeller wheel (3) and the turbine wheel (4).

* * * * *